Patented Jan. 30, 1940

2,188,778

UNITED STATES PATENT OFFICE 2,188,778

PRODUCTION OF POLYMERIZATION PRODUCTS OF VINYL ETHERS

Walter Reppe, Ludwigshafen-on-the-Rhine, and Erich Kuehn, Mannheim, Germany, assignors to I. G. Farbenindustrie Aktiengesellschaft, Frankfort-on-the-Main, Germany No Drawing. Original application July 19, 1935, Serial No. 32,276. Divided and this application February 25, 1937, Serial No. 127,768. In Germany July 26, 1934

2 Claims. (Cl. 260—90)

The present invention relates to the production of polymerization products of vinyl ethers.

We have found that vinyl ethers can be polymerized in an advantageous manner with sulphur dioxide. The fact that sulphur dioxide acts as a polymerizing agent in the case of vinyl ethers is surprising because in the case of diolefines, as for example butadiene, sulphur dioxide does not act as a polymerization accelerator but reacts with the diolefines with the formation of high molecular sulphones.

It has already been proposed to polymerize vinyl ethers while employing for polymerization accelerators acid condensing agents, substances having large surfaces, or boron halides in the form of their addition or conversion products with ethers or alcohols.

Contrasted with this process the present invention means a great advantage in practice because when employing sulphur dioxide the speed of polymerization can be more readily regulated and the resulting heat may be uniformly withdrawn. The polymerization may be carried out in the presence or absence of solvents. As solvents may be mentioned for example suitable aliphatic, cycloaliphatic and aromatic hydrocarbons, such as benzine hydrocarbons, cyclohexane or benzene, their chlorination products, as for example ethylene chloride or chlorinated benzene, carbon disulphide, and ethers and esters, such as diethyl ether and ethyl acetate.

A further advantage of the process according to this invention consists in the fact that it may also be employed for the polymerization of vinyl ethers containing basic groups in the molecule which could hitherto not, or scarcely be polymerized with the aid of the known acid condensing agents, as for example the vinyl ethers of N-hydroxyethylaniline, N-hydroxyethyl-meta-chloraniline, N-hydroxyethyl-meta-toluidine, 8-hydroxyquinoline and ethanolamine. The said vinyl ethers may be obtained by causing acetylene to act at elevated temperatures on the corresponding organic hydroxy compound in a strongly alkaline medium.

The process according to this invention is very advantageous also for polymerizing such vinyl ethers as contain acetal groups, as for example glycerol formaldehyde acetal vinyl ether of the formula

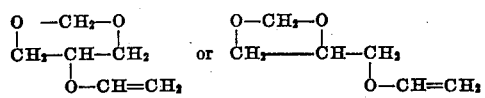

glycerol acetaldehyde acetal vinyl ether, glycerol benzaldehyde acetal vinyl ether, glycerol acetone acetal vinyl ether which may be obtained by reacting acetylene at elevated temperatures, if desired under elevated pressure, with the acetal of polyvalent alcohols still possessing at least one free hydroxyl group, in the presence of substances having a strongly alkaline reaction. The polymerization products of these acetal vinyl ethers are solid, non-sticky products.

The ploymerization is preferably carried out below the boiling point of sulphur dioxide, but may also be carried out at the boiling temperature, whereby the heat of polymerization may be withdrawn by reflux cooling. If the polymerization be carried out above the boiling point of sulphur dioxide, it is preferable to work in a closed vessel in order to be able to maintain a sufficiently high concentration of sulphur dioxide. Contrasted with the use of boron fluoride or aluminium chloride, polymerization with sulphur dioxide requires considerable amounts of the polymerizing agent. Consequently the sulphur dioxide usually acts at the same time as solvent or diluent for the polymerization product. Other polymerizing agents, as for example boron fluoride or aluminium chloride may also be added if desired to the sulphur dioxide.

When vinyl ethers are allowed to flow gradually while stirring into liquid sulphur dioxide, polymerization takes place immediately upon contact of the ethers with the sulphur dioxide. The speed at which the ethers flow in can be regulated according to the speed at which the heat of reaction can be withdrawn so that the reaction temperature is kept constant. The polymerization product dissolves in the sulphur dioxide so that a viscous solution of the polymerized vinyl ethers in the sulphur dioxide is formed. Consequently the heat produced can be uniformly withdrawn even at the end of the polymerization.

When gaseous sulphur dioxide is condensed by cooling in monomeric vinyl ethers, polymerization first commences quite gradually after leading in sulphur dioxide for a long time and the polymerization proceeds at so slow a speed that the heat of polymerization can be withdrawn without trouble. The polymerization product is also obtained in the form of a viscous solution in this case.

By employing several vinyl ethers in the said process, mixed polymerization products may be obtained, the properties of the polymerization products thus being varied within wide limits.

The following examples will further illustrate how our invention may be carried out in practice but the invention is not restricted to these examples. The parts are by weight.

Example 1

100 parts of vinyl butyl ether are allowed to drop slowly while stirring into 50 parts of liquid sulphur dioxide in a vessel provided with a reflux condenser. The temperature is kept at about 10° below zero C. by cooling so that the sulphur dioxide slowly boils under reflux. When all the vinyl butyl ether has been introduced, the whole is stirred for an hour at the boiling temperature of sulphur dioxide. The sulphur dioxide may be expelled from the resulting viscous solution by slight heating. The last traces may be removed by employing reduced pressure or also by blowing it out with steam. The reaction product is a colorless, viscous, sticky mass.

Example 2

Gaseous sulphur dioxide is led into 100 parts of vinyl ethyl ether at 15° below zero C. and thus condensed. When about 100 parts of sulphur dioxide have been condensed the polymerization gradually commences and is completed after from about ten to fifteen hours. The viscous solution is freed from sulphur dioxide in the manner described in Example 1. The resulting polymerized vinyl ethyl ether is a colorless mass which is scarcely liquid.

Example 3

200 parts of the vinyl ether of N-hydroxyethyl-meta-toluidine are gradually dropped into 150 parts of sulphur dioxide at 40° below zero C. while stirring. Polymerization takes place immediately. The sulphur dioxide is then evaporated and the last traces removed under reduced pressure. The polymerization product is a reddish product which is plastic at room temperature. It yields salts soluble in water with mineral acids and also with organic carboxylic acids. It may be coupled with diazo solutions to give dyestuffs of high molecular weight.

Example 4

200 parts of glycerol formaldehyde acetal vinyl ether are dropped into 70 parts of liquefied sulphur dioxide within from 2 to 3 hours at about 60° below zero C. while stirring and cooling and further adding slowly about 130 parts of sulphur dioxide. Polymerization takes place immediately. The polymerization product obtained after having been worked up in the manner described in Example 1, is a colorless, solid, tough product.

This invention is a division of application Ser. No. 32,276, filed July 19, 1935.

What we claim is:

1. The process of producing polyvinyl ethers which comprises treating a vinyl ether containing a basic group in the molecule with sulphur dioxide.
2. The polymer of the vinyl ether of N-hydroxyethyl-meta-toluidine.

WALTER REPPE.
ERICH KUEHN.